(12) United States Patent
Lele

(10) Patent No.: US 9,085,709 B1
(45) Date of Patent: Jul. 21, 2015

(54) SURFACTANTS DERIVED FROM EPOXIDIZED OILS AND COMPOSITIONS THEREOF

(76) Inventor: Bhalchandra Shripad Lele, Newark, DE (US)

( * ) Notice: Subject to any disclaimer, the term of this patent is extended or adjusted under 35 U.S.C. 154(b) by 924 days.

(21) Appl. No.: 13/292,970

(22) Filed: Nov. 9, 2011

Related U.S. Application Data

(60) Provisional application No. 61/417,424, filed on Nov. 28, 2010.

(51) Int. Cl.
| | | |
|---|---|---|
| C07D 303/40 | (2006.01) |
| C08G 63/68 | (2006.01) |
| C08G 63/42 | (2006.01) |
| C08G 75/04 | (2006.01) |
| C08G 75/00 | (2006.01) |
| C08G 67/02 | (2006.01) |
| B32B 27/38 | (2006.01) |
| C08G 59/22 | (2006.01) |
| C09D 163/00 | (2006.01) |
| C09D 163/08 | (2006.01) |
| C09D 163/10 | (2006.01) |

(52) U.S. Cl.
CPC ............ C09D 163/00 (2013.01); *C09D 163/08* (2013.01); *C09D 163/10* (2013.01)

(58) Field of Classification Search
CPC ... C09D 163/00; C09D 163/08; C09D 163/10
USPC .......... 522/170; 528/293, 297, 376, 364, 392; 428/413; 523/428
See application file for complete search history.

(56) References Cited

U.S. PATENT DOCUMENTS 3,821,155 A * 6/1974 Kloos ........................... 523/171

* cited by examiner

*Primary Examiner* — William Cheung

(57) ABSTRACT

Present invention relates to surfactants derived from epoxidized oils and compositions thereof. Particularly this invention describes surfactants derived from epoxidized oils covalently attached to water soluble polymers via thioether bond forming linker and formulations thereof.

11 Claims, 4 Drawing Sheets

Schematic representation of preparation of surfactant derived from epoxidized soybean oil, thioether bond forming linker, and water soluble polymer.

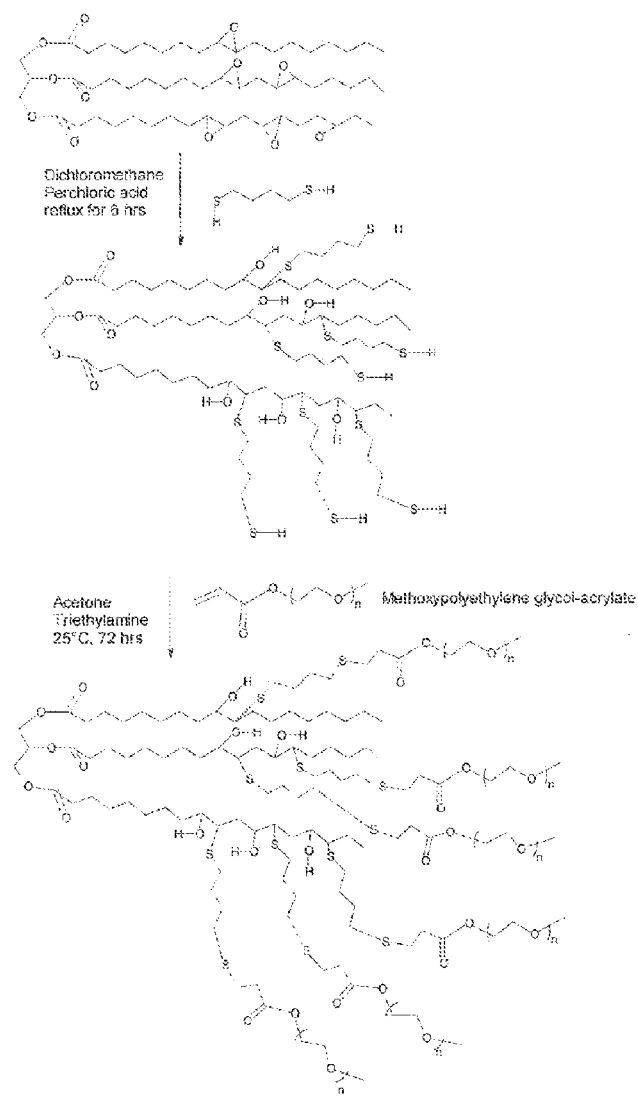
Figure 1: Schematic representation of preparation of surfactant derived from epoxidized soybean oil, thioether bond forming linker, and water soluble polymer.

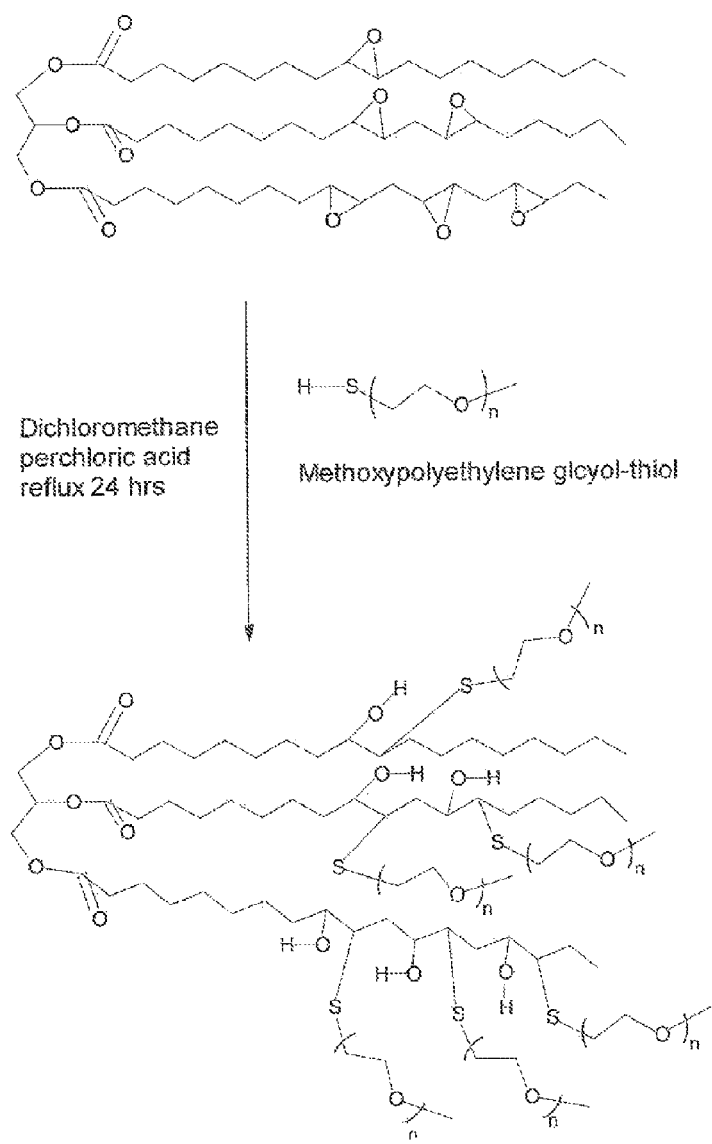
Figure 2: Schematic representation of preparation of surfactant derived from epoxidized soybean oil, and thiol containing water soluble polymer.

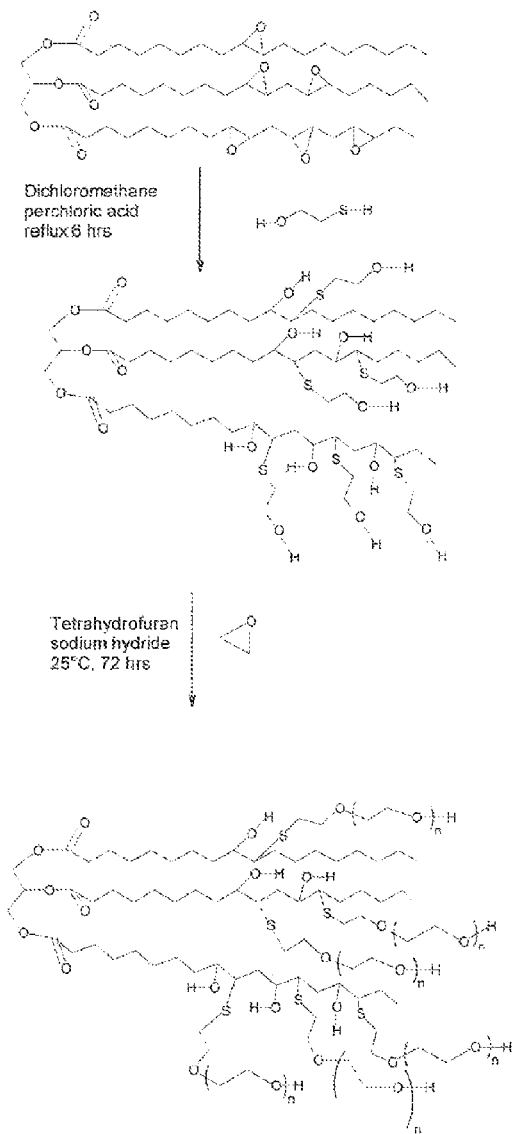
Figure 3: Schematic representation of preparation of surfactant derived from epoxidized soybean oil, thioether bond forming linker and monomer polymerization initiated by linker.

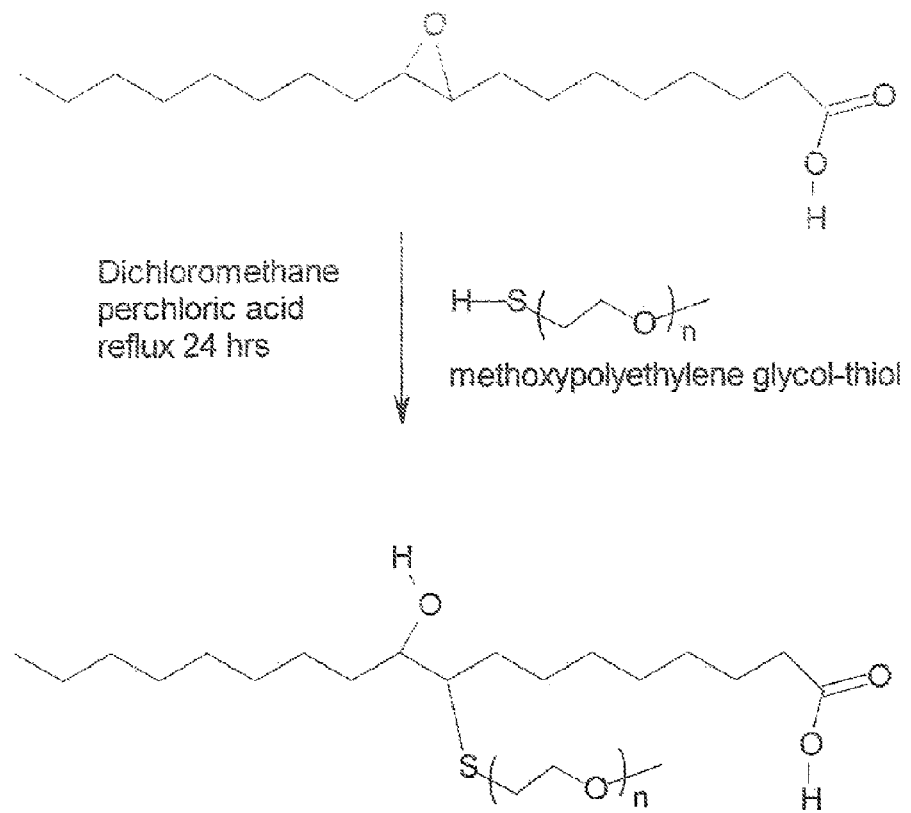
Figure 4: Schematic representation of preparation of surfactant derived from epoxidized oleic acid and thiol containing water soluble polymer.

SURFACTANTS DERIVED FROM EPOXIDIZED OILS AND COMPOSITIONS THEREOF

BACKGROUND OF THE INVENTION

Polyoxyethylated castor oils or Cremophor(s) are nonionic surfactants used to solubilize or disperse perfumes, cosmetics, vitamins, pharmaceuticals, pesticides and paints, in aqueous media. Ability of polyoxethylated castor oils to solubilize so many different substances stems from their unique chemical structures presenting hydrophilic polymer chains attached in the center of fatty acid alkyl chains in castor oil triglycerides. Main component of castor oil is triricinolein or triglyceride of ricinoleic acid which contains free hydroxyl group at C12 position in each of the three fatty acid alkyl chains in its structure. Polymerization of ethylene oxide is initiated from these hydroxyl groups and surfactants with a range of hydrophilic-lipophilic balance values (HLB values) are prepared.

Polyoxyethylated castor oils however are known to cause hypersensitivity reactions in pharmaceutical formulations such as of paclitaxel (Cremophor EL containing paclitaxel-induced anaphylaxis: a call to action, Irizarry, L. D. et al Community Oncology, 6(3) 132-134 (2009)). Additionally, castor oil harvesting poses a human health risk due to the formation of side product ricin which is a potent toxin. Edible oils are much safer and cheaper alternative to castor oil as raw material for preparation of surfactants. Therefore it is desirable to prepare surfactants that are safer, equivalent substitute for polyoxyethylated castor oils but are derived from edible oils. Besides, Cremophor EL is a complex mixture of many surfactant species formed by reaction of castor oil triglycerides and ethylene oxide polymers (Separation and first structure elucidation of Cremophor-EL components by hyphenated capillary electrophoresis and delayed extraction-matrix assisted laser desorption/ionization time of flight mass spectrometry, Meyer, T. et al Electrophoresis 23(7-8) 1053-1062 (2002)). In pharmaceutical preparations, well-defined structure of surfactant is highly desirable. Thus, there is need of surfactants with well-defined structure and controllable molecular weight and functionality of attached polyoxyethylene chains. Therefore, it is desirable to devise a chemistry that allows strict control on the molecular weight and functionality of polyoxyethylene chains attached to a surfactant formed by oil.

However, edible oils do not contain reactive hydroxyl group in the center of fatty acid alkyl chains in their structures which could be utilized to attach polymer chains as in the case of polyoxyethylated castor oil. Only carbon-carbon double bonds are present in the center of fatty acid alkyl chains in unsaturated edible oils. Epoxidation of double bonds in unsaturated edible oils is most commonly used to attempt any chemical modification of the oil.

For example U.S. Pat. No. 5,442,082 describe preparation of surfactants by reacting epoxidized soybean oil with glycerol followed by polymerization of ethylene oxide initiated by the newly attached hydroxyl groups to the modified soybean oil. Similarly, U.S. Pat. No. 6,057,375 describe preparation of surfactants by reacting epoxidized soybean oil with carboxylic acids to open the epoxide ring followed by polymerization of ethylene oxide initiated by free hydroxyl groups in the modified oil made available by epoxide ring opening. Such reactions are typically carried out at high temperatures because of poor reactivity of hydroxyl and carboxyl groups towards opening of epoxide rings in the oil. At high temperatures, triacylglycerol structures of oils are susceptible to transesterification reactions with alcohols thus resultant product is a complex mixture of different surfactant species. Also, high temperature and plurality of initiator sites involved generally result in complex mixture of ethylene oxide polymers and surfactants thereof.

OBJECT OF THE INVENTION

Therefore the object of this invention is to provide well-defined surfactants derived from epoxidized oils that are equivalent but safer substitutes for polyoxyethylated castor oils.

It is also the object of this invention to provide well-defined surfactants derived from epoxidized oils, as equivalent substitutes for polyoxyethylated castor oils that are covalently attached to polyoxyethylene chains of strictly controlled molecular weight and functionality.

It is also the object of this invention to provide the process for the preparation of surfactants derived from epoxidized oils that are equivalent but safer substitutes for polyoxyethylated castor oils.

It is also the object of this invention to provide formulations of substances requiring solubilization and surfactants that are equivalent substitutes for polyoxyethylated castor oils and are derived from epoxidized oils covalently attached to polyoxyethylene chains of controlled molecular weight and functionality.

Finally it is also the object of this invention to provide surfactants derived from a variety of epoxidized oils covalently attached to a variety of water soluble polymers and formulations thereof with compounds requiring solubilization.

BRIEF DESCRIPTION OF FIGURES (DRAWINGS) DISCUSSED IN THE SPECIFICATION

FIG. 1: Schematic representation of preparation of surfactant derived from epoxidized soybean oil, thioether bond forming linker, and water soluble polymer.

FIG. 2: Schematic representation of preparation of surfactant derived from epoxidized soybean oil, and thiol containing water soluble polymer.

FIG. 3: Schematic representation of preparation of surfactant derived from epoxidized soybean oil, thioether bond forming linker and monomer polymerization initiated by linker.

FIG. 4: Schematic representation of preparation of surfactant derived from epoxidized oleic acid and thiol containing water soluble polymer.

DESCRIPTION OF THE INVENTION

Sharma et al described mild reaction conditions for opening epoxide ring in epoxidized soybean oil by thiols to produce hydroxyl-thio ether derivatives of vegetable oils as substitutes for synthetic lubricants (J. Agric. Food Chem. 54, 9866-9872 (2006)). Triacyl glycerol structure of the oil was not disturbed because of the mild reaction conditions used. However, it is neither known nor obvious in the prior art that this thiol-epoxide chemistry can be used to prepare surfactants derived from epoxidized oils that are equivalent substitutes for polyoxyethylated castor oils. Moreover, it is neither known nor obvious in the prior art that thiol-epoxide chemistry of the present invention can be used to prepare surfactants that are equivalent substitutes for polyoxyethylated castor oils and are derived from edible oils covalently attached to polyoxyethylene chains of strictly controlled molecular weight and functionality. It is also not obvious or known in the prior art that thiol-epoxide chemistry of the present invention can be used to prepare surfactants from a variety of epoxidized oils covalently attached to water soluble polymers at the epoxidation sites in the said oils.

It has now been found that epoxidized oils can be covalently attached to water soluble polymers at the epoxidation sites in the said oils using thiol-epoxide chemistry and surfactants that are equivalent substitutes for polyoxyethylated castor oil can be prepared. More particularly, the said surfactants are obtained by first conducting thiol-epoxide ring opening reaction between epoxidized oil and thioether bond forming linker to form the oil-linker conjugate, and then covalently attaching a water soluble polymer to the modified oil via the linker. Alternatively, surfactants of the present invention are also obtained by reacting epoxidized oil with thiol containing water soluble polymer. Present invention has following advantages over the prior art—1) it provides surfactants that are equivalent substitutes for polyoxyethylated castor oil but are derived from epoxidized edible oils and are therefore safer. 2) Polymer attachment to the oil through linker allows for preparation of a range of surfactants with strictly controllable, predetermined molecular weights and functionalities.

EMBODIMENTS OF THE PRESENT INVENTION

In an embodiment of the present invention is provided a surfactant formed by epoxidized oil covalently attached to a water soluble polymer at at least one site of epoxidation in the said oil via a thioether bond forming linker; wherein, the linker opens the epoxide ring at the said site of epoxidation forming thioether bond with the oil and provides functional group through which the said water soluble polymer is conjugated to the said oil.

In another embodiment of the present invention, said epoxidized oil is selected from a group of oils consisting epoxidized olive oil, epoxidized corn oil, epoxidized canola oil, epoxidized soybean oil, epoxidized rap seed oil, epoxidized linseed oil, epoxidized trilinolein, epoxidized triolein, epoxidized peanut oil, epoxidized fish oil, epoxidized sunflower oil, epoxidized mustard oil, epoxidized almond oil, epoxidized palm oil, epoxidized sesame oil, epoxidized safflower oil, epoxidized cottonseed oil, epoxidized grape seed oil, epoxidized rice bran oil, epoxidized mono, di, triglycerides of unsaturated fatty acids of C7 to C22 chain length, epoxidized unsaturated fatty acids of C7 to C22 chain length, and mixtures thereof.

In yet another embodiment of the present invention, said water soluble polymer is at least one member selected from group consisting polyethylene glycol, polyethylene oxide, polyethylene glycol methyl ether, homo and heterobifuctional polyethylene glycols, polyethylene glycol-co-polypropylene glycol, polyethylene oxide-block-polypropylene oxide, polyethylene glycol-methacrylate, poly(N-2-hydroxypropylmethacrylamide), poly(N-vinylpyrrolidone), poly(N-isopropylacrylamide), poly(acrylic acid), poly(methacrylic acid), poly(2-aminoethyl methacrylate), poly(N,N-dimethylaminoethyl methacrylate) and copolymers thereof.

In still another embodiment of the present invention, said thioether bond forming linker is at least one member selected from group consisting 2-mercpatoethanol, 4-mercaptobutanol, 2-mercaptoethylamine, 3-mercaptopropionic acid, 3-mercaptomaleimide, 1,2-ethanedithiol, 1,4-butanedithiol, L-cysteine ethyl ester and combinations thereof.

In another embodiment, at least one targeting moiety is conjugated to the said water soluble polymer.

In an embodiment of the present invention is provided a process for the preparation of surfactant comprising reacting epoxidized oil and a thioether bond forming linker in an organic solvent in the presence of a catalyst at a temperature in the range of 20-150° C. for a time period in the range of 1 to 100 hrs to open epoxide ring and form thioether bond with the oil, followed by conjugating a water soluble polymer to the free functional group on thioether bond forming linker covalently attached to the said oil.

In another embodiment of the present invention is provided a process for the preparation of surfactant comprising reacting epoxidized oil and a water soluble polymer containing thiol group in an organic solvent in the presence of a catalyst at a temperature in the range of 20-150° C. for a time period in the range of 1 to 100 hrs to open epoxide ring and form thioether bond with the oil and form covalent bond between the said oil and said polymer.

In yet another embodiment is provided a process for the preparation of surfactant comprising reacting epoxidized oil and a thioether bond forming linker in an organic solvent in the presence of a catalyst at a temperature in the range of 20-150° C. for a time period in the range of 1 to 100 hrs to open epoxide ring and form thioether bond with the oil, followed by initiating polymerization of a monomer from the free functional group on thioether bond forming linker covalently attached to the said oil.

In an embodiment of the present invention is provided a formulation comprising surfactant of the present invention and a compound requiring solubilization or dispersion in aqueous medium.

In another embodiment of the present invention is provided a formulation comprising surfactant of the present invention and a pharmaceutically active compound requiring solubilization or dispersion in aqueous medium.

In another embodiment of the present invention is provided a formulation comprising surfactant of the present invention and a pharmaceutically active compound requiring solubilization or dispersion in aqueous medium, wherein the pharmaceutically active compound is a taxane.

In an embodiment of the present invention, formulation comprising surfactant of the present invention and a compound requiring solubilization are provided wherein the compound requiring solubilization is selected from a group consisting pharmaceutically active compounds, peptides, vitamins, oils, pesticides, insecticides, perfumes, and paints.

Following examples illustrate the surfactant of the present invention, process of preparation thereof, and formulation consisting of a compound requiring solubilization and surfactant of the present invention. The following examples are provided as illustration and are not construed as limiting the invention.

Example 1

Preparation of Surfactant Derived from Epoxidized Soybean Oil and Methoxypolyethylene Glycol Thiolation of Soybean Oil:

Epoxidized soybean oil (25 g, (26 mmol) (Vikoflex 7170 from Arkema Inc.), 1,4-butanedithiol (26.6 g (218 mmol)) is dissolved in 400 mL diclhloromethane. To this, perchloric acid (2.6 g) is added slowly under stirring. The reaction mixture is refluxed for 6 hrs and allowed to cool to room temperature. The reaction mixture is washed with 200 mL 5% sodium bicarbonate solution. The organic layer is separated, dried on anhydrous sodium sulfate and concentrated under vacuum.

Excess of unreacted 1,4-butanedithiol is removed by extracting the viscous liquid with methanol.

Thiolated soybean oil (16 g) is dissolved in 400 mL dichloromethane. To this, methoxypolyethylene glycol 2000-acrylate (60 g), and triethylamine (5 ml) is added. Reaction mixture is stirred at room temperature for 24 hrs. Solvents are removed under vacuum to obtain the surfactant derived from epoxidized soybean oil and methoxypolyethylene glycol. Reaction is schematically represented in FIG. 1.

Example 2

Preparation of Surfactant Derived from Epoxidized Soybean Oil and Methoxypolyethylene Glycol Epoxidized soybean oil (0.25 g (0.26 mmol) (Vikoflex 7170 from Arkema Inc.), polyethylene glycol monomethyl ether thiol Mw 1000 (1.3 g, from Sigma-Aldrich) is dissolved in 40 mL diclhloromethane. To this, perchloric acid (0.26 g) is added slowly under stirring. The reaction mixture is refluxed for 24 hrs and allowed to cool to room temperature. The reaction mixture is washed with 20 mL 5% sodium bicarbonate solution. The organic layer is separated, dried on anhydrous sodium sulfate and concentrated under vacuum. To obtain the surfactant derived from epoxidized soybean oil and methoxypolyethylene glycol. Reaction is schematically represented in FIG. 2.

Example 3

Preparation of Surfactant Derived from Epoxidized Soybean Oil and Polyethylene Glycol Hydroxylated Soybean Oil:

Epoxidized soybean oil (25 g, (26 mmol) (Vikoflex 7170 from Arkema Inc.), 2-mercaptoethanol (17.0 g (218 mmol)) is dissolved in 400 mL diclhloromethane. To this, perchloric acid (2.6 g) is added slowly under stirring. The reaction mixture is refluxed for 6 hrs and allowed to cool to room temperature. The reaction mixture is washed with 200 mL 5% sodium bicarbonate solution. The organic layer is separated, dried on anhydrous sodium sulfate and concentrated under vacuum. Excess of unreacted 2-mercaptoethanol is removed by extracting the viscous liquid with methanol.

Hydroxylated soybean oil (100 mg) is dissolve in 10 mL tetrahydrofuran in a round bottom flask. To this, 20 mg sodium hydride added and stirred under Argon for 30 min. To this, 1 g ethylene oxide is added via syringe and reaction mixture is stirred at room temperature for 3 days. The reaction mixture is concentrated in vacuum to obtain the surfactant formed. Reaction is schematically represented in FIG. 3.

Example 4

Preparation of Surfactant Derived from Epoxidized Oleic Acid and Methoxypolyethylene Glycol Oleic acid (90%, 10 g) is mixed with formic acid (88%, 9.0 mL) at 4° C. To this, hydrogen peroxide (30% in H2O, 8.0 mL) is added slowly. The reaction mixture is stirred at room temperature vigorously until the formation of a white, powdery solid is formed. The solid is washed with cold water and dried under vacuum to obtain epoxidized oleic acid.

Epoxidized oleic acid (0.284 g (1 mmol)), polyethylene glycol monomethyl ether thiol Mw 1000 (1 g (1 mmol) from Sigma-Aldrich) is dissolved in 40 mL diclhloromethane. To this, perchloric acid (0.26 g) is added slowly under stirring. The reaction mixture is refluxed for 24 hrs and allowed to cool to room temperature. The reaction mixture is washed with 200 mL 5% sodium bicarbonate solution. The organic layer is separated, dried on anhydrous sodium sulfate and concentrated under vacuum to obtain the surfactant derived from epoxidized oleic acid and methoxypolyethylene glycol. Reaction is schematically represented in FIG. 4.

Example 5

Formulation of Paclitaxel with Surfactant Derived from Epoxidized Soybean Oil and Methoxypolyethylene Glycol (Example 1)

A 5.0 mL volumetric flask is charged with surfactant of example 1 (500 mg), paclitaxel (5 mg) and ethanol (0.42 mL). The mixture is heated to dissolve forming syrup which is viscous but homogeneous. While still warm, 0.9% (w/v) sodium chloride solution in water is added, bringing the total volume to 5 mL (1 mg paclitaxel/mL of formulation). The formulation is allowed to stand overnight (15 hrs), at which time there is still no precipitation of paclitaxel observed.

The invention claimed is:

1. A surfactant formed by epoxidized oil covalently attached to a water soluble polymer at at least one site of epoxidation in the said oil via a thioether bond forming linker; wherein, the linker opens the epoxide ring at the said site of epoxidation forming thioether bond with the oil and provides functional group through which the said water soluble polymer is conjugated to the said oil.

2. Surfactant of claim 1 wherein said epoxidized oil is selected from a group of oils consisting epoxidized olive oil, epoxidized corn oil, epoxidized canola oil, epoxidized soybean oil, epoxidized rap seed oil, epoxidized linseed oil, epoxidized trilinolein, epoxidized triolein, epoxidized peanut oil, epoxidized fish oil, epoxidized sunflower oil, epoxidized mustard oil, epoxidized almond oil, epoxidized palm oil, epoxidized sesame oil, epoxidized safflower oil, epoxidized cottonseed oil, epoxidized grape seed oil, epoxidized rice bran oil, epoxidized mono, di, triglycerides of unsaturated fatty acids of C7 to C22 chain length, epoxidized unsaturated fatty acids of C7 to C22 chain length, and mixtures thereof.

3. Surfactant of claim 1 wherein said water soluble polymer is at least one member selected from group consisting polyethylene glycol, polyethylene oxide, polyethylene glycol methyl ether, homo and heterobifuctional polyethylene glycols, polyethylene glycol-co-polypropylene glycol, polyethylene oxide-block-polypropylene oxide, polyethylene glycol-methacrylate, poly(N-2-hydroxypropylmethacrylamide), poly(N-vinylpyrrolidone), poly(N-isopropylacrylamide), poly(acrylic acid), poly(methacrylic acid), poly(2-aminoethyl methacrylate), poly(N,N-dimethylaminoethyl methacrylate) and copolymers thereof.

4. Surfactant of claim 1 wherein said thioether bond forming linker is at least one member selected from group consisting 2-mercpatoethanol, 4-mercaptobutanol, 2-mercaptoethylamine, 3-mercaptopropionic acid, 3-mercaptomaleimide, 1,2-ethanedithiol, 1,4-butanedithiol, L-cysteine ethyl ester and combinations thereof.

5. Surfactant of claim 1 wherein at least one targeting moiety is conjugated to the said water soluble polymer.

6. A process for the preparation of surfactant of claim 1 comprising reacting epoxidized oil and a thioether bond forming linker in an organic solvent in the presence of a catalyst at a temperature in the range of 20-150° C. for a time period in the range of 1 to 100 hrs to open epoxide ring and form thioether bond with the oil, followed by conjugating a water soluble polymer to the free functional group on thioether bond forming linker covalently attached to the said oil.

7. A process for the preparation of surfactant of claim 1 comprising reacting epoxidized oil and a water soluble polymer containing thiol group an organic solvent in the presence of a catalyst at a temperature in the range of 20-150° C. for a time period in the range of 1 to 100 hrs to open epoxide ring and form thioether bond with the oil and form covalent bond between the said oil and said polymer.

8. A process for the preparation of surfactant of claim 1 comprising reacting epoxidized oil and a thioether bond forming linker in an organic solvent in the presence of a catalyst at a temperature in the range of 20-150° C. for a time period in the range of 1 to 100 hrs to open epoxide ring and form thioether bond with the oil, followed by initiating polymerization of a monomer from the free functional group on thioether bond forming linker covalently attached to the said oil.

9. A formulation comprising surfactant of claim 1 and a compound requiring solubilization or dispersion in aqueous medium.

10. A formulation of claim 9 wherein a compound requiring solubilization or dispersion is pharmaceutically active compound.

11. A formulation of claim 10 wherein pharmaceutically active compound requiring solubilization or dispersion is a taxane.

\* \* \* \* \*